United States Patent [19]

Hahlganss

[11] 3,863,151

[45] Jan. 28, 1975

[54] APPARATUS FOR CAUSING A METER TO MEASURE THE RATE OF ROTATION OF A SHAFT

[75] Inventor: Gunther Hahlganss, Kriftel, Germany

[73] Assignee: VDO Adolf Schindling GmbH, Frankfurt, Germany

[22] Filed: Jan. 29, 1973

[21] Appl. No.: 327,403

[30] Foreign Application Priority Data
Jan. 31, 1972 Germany............................ 2204331

[52] U.S. Cl....................... 324/167, 317/6, 318/318
[51] Int. Cl. .............................................. G01p 3/48
[58] Field of Search ........... 324/161, 166, 167, 173, 324/174, 175, 78 N; 317/5, 6; 318/312, 318; 73/518–520

[56] References Cited
UNITED STATES PATENTS

| | | | |
|---|---|---|---|
| 3,206,665 | 9/1965 | Burlingham.......................... | 318/312 |
| 3,719,886 | 3/1973 | Vanderberg......................... | 324/161 |
| 3,724,720 | 4/1973 | Bullivant............................. | 318/318 |

Primary Examiner—Michael J. Lynch
Attorney, Agent, or Firm—Otto John Munz

[57] ABSTRACT

An apparatus for transmitting the rotary motion of a first shaft (as on a vehicle) to a second shaft (as on a speedometer), wherein the second shaft is at a distance from and mechanically isolated from the first shaft. It is particularly useful for transmitting the rotary motion of a motor vehicle shaft whose rotational speed is a function of the traveling speed of the motor vehicle to the magnetic shaft of an eddy current tachometer. The apparatus comprises a first pulse transmitter actuated by the vehicle shaft, and an electric motor mechanically coupled to the speedometer shaft and controlled by the first pulse transmitter. The motor is a D.C. motor, whose shaft actuates a second pulse transmitter.

One of the forward or backward counting inputs of an electronic forward-backward counter is connected to the first pulse transmitter actuated by the vehicle shaft and the other of the backward or forward counting inputs of the counter is connected to the second pulse transmitter. The outputs of the counter are connected to an evaluation circuit of weighted resistors which constitutes a branch of a bridge whose potential difference across the zero diagonal serves as a control voltage for the D.C. motor.

10 Claims, 1 Drawing Figure

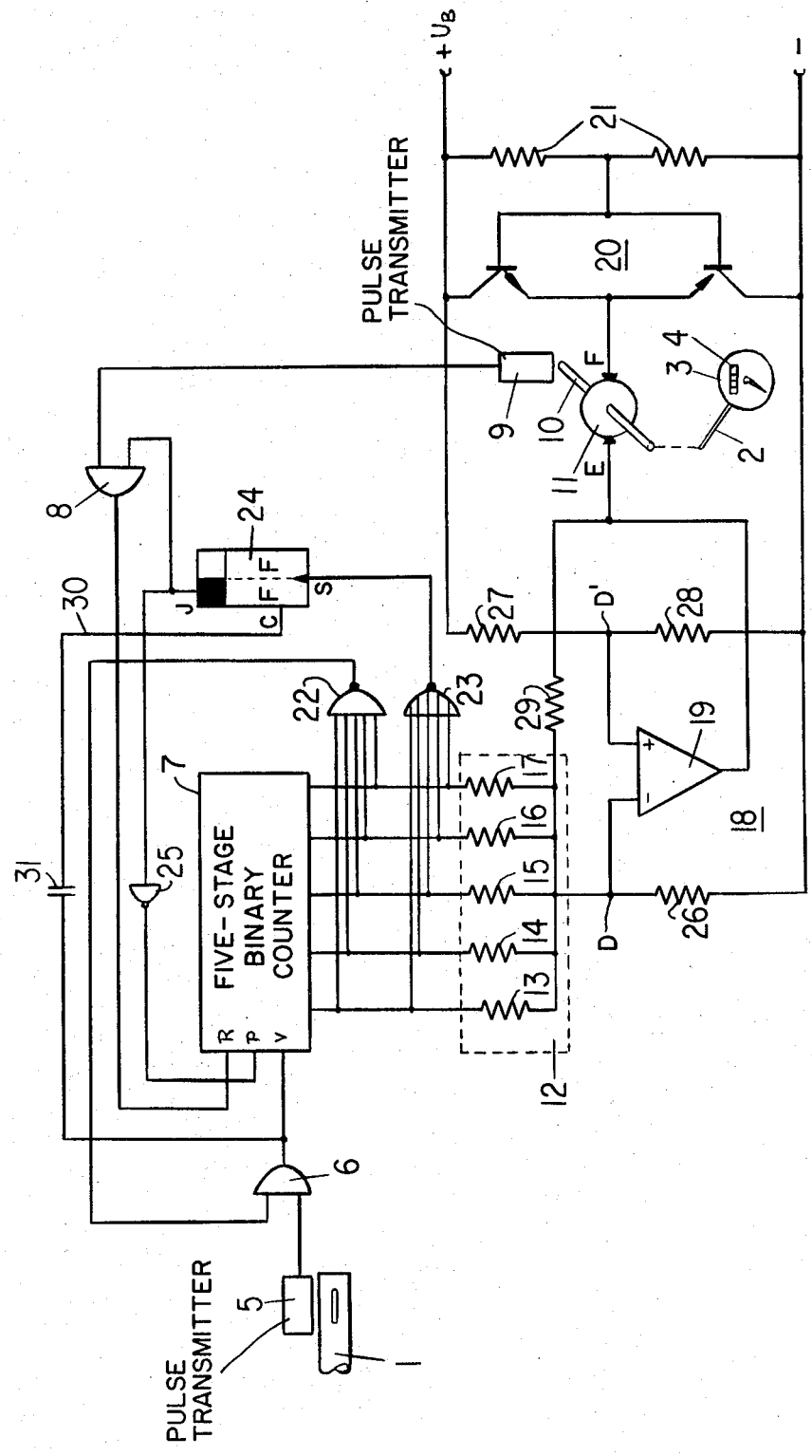

1

APPARATUS FOR CAUSING A METER TO MEASURE THE RATE OF ROTATION OF A SHAFT

CROSS-REFERENCES TO A RELATED APPLICATION

Priority of a corresponding German Patent application No. P 22 04 331.8 filed Jan. 31, 1972 is claimed.

BACKGROUND OF THE INVENTION

This invention relates to an electronic control system for causing a meter to measure the rate of rotation of a shaft.

DESCRIPTION OF THE PRIOR ART

In telemetering the number of shaft revolutions per unit of time, a pulse transmitter which converts a direct current into a series of pulses of a frequency proportional of the rate of shaft revolutions is used with the shaft whose rate of revolution is to be measured. This series of pulses is fed to a synchronous motor whose shaft is coupled to the magnetic shaft of an eddy current speedometer. A device will operate satisfactorily at very low frequencies and at rather high frequencies, the synchronous motor running in step-by-step operation at low frequencies and in synchronous operation at high frequencies. In the transition of the synchronous motor from the step-by-step to the synchronous operation, generally large torque drop occurs, which, even at low loads of the synchronous motor, leads to slippage from the synchronous operation. By a suitable construction of the synchronous motor, the torque drop can be held within certain limits, so that, when the load of the synchronous motor is not too heavy, a continuous measurement of the rate of revolution from zero to high rates of revolution can be carried out. This measurement, however, becomes erroneous especially in the drive of eddy current speedometers for motor vehicles since in such vehicles in addition a mileage measuring mechanism must be operated. A relatively high torque is required, which the synchronous motor, notwithstanding a suitable construction of the apparatus, cannot produce in the transition range between the step-by-step and synchronous operation.

SUMMARY OF THE INVENTION

The primary object of the invention is to provide an apparatus for transmitting the rotary motion of a shaft to a second shaft, in which apparatus a torque of such great magnitude is available in the second shaft that the drive of an eddy current tachometer for motor vehicles or of some other indicating, recording, controlling, or regulating system that requires a high torque is thereby made possible.

Another object of the invention is to provide an apparatus of the type described which operates as accurately as possible over a large range of rates of revolution, stating from zero which is insensitive to variations of the operating voltage and which requires a minimum space.

Yet another object of the invention is to provide such an apparatus which can be mass-produced inexpensively.

Another object of the invention is to eliminate the conventional flexible shaft to a vehicle speedometer.

Other objects and many of the attendant advantages of this invention will become apparent to those skilled in the art from the accompanying drawing and after consideration of the following description thereof.

BRIEF DESCRIPTION OF THE DRAWING

The sole FIGURE of drawings is a diagrammatic showing of a preferred embodiment of the invention of the circuitry between a vehicle shaft and a speedometer shaft and output.

DESCRIPTION OF THE PREFERRED EMBODIMENTS

The invention relates to an apparatus for transmitting the rotary motion of a first shaft to a second shaft spaced from the first shaft, particularly for transmitting the rotary motion of a motor vehicle shaft, whose rotational speed is a function of the traveling speed of the motor vehicle, to the magnetic shaft of an eddy current speedometer. The apparatus comprises a first pulse transmitter actuated by the first shaft, and an electric motor coupled to the second shaft positively or in a form-locking manner and controlled by the pulse transmitter. A D.C. motor is employed whose shaft actuates a second pulse transmitter, and an electronic forward-backward counter whose forward or backward counting input is connected to the pulse transmitter actuated by the vehicle shaft. The other of the backward or forward counting inputs of said counter is connected to a second pulse transmitter, and its outputs are connected to an evaluation circuit which forms the branch of a bridge whose potential difference in the zero-balanced diagonal serves as control voltage for the D.C. motor.

The pulses produced by the first pulse transmitter, e.g., as a function of the traveling speed of the vehicle, are fed to the counter so that the latter departs from its normal position in which, on the basis of the selected evaluation circuit, the bridge is balanced and the D.C. motor is at rest, and the bridge changes over into a non-balanced state. Consequently, the D.C. motor starts running and actuates the second pulse transmitter which transmits its pulses to the counter input assigned to it, e.g., the backward counting input. By the contents of the counter, which is thereby reduced again, the imbalance of the bridge decreases until a state of balance occurs at which the pulses fed per time unit to the counter inputs are equal and therefore both shafts rotate at the same rate of revolution. Since the comparison of the rate of revolution is carried out on a digital basis, an accurately operating apparatus results which, in addition, is insensitive to variations of the operating voltage and is therefore excellently suited, among other things, for use in motor vehicles. By the employment of a D.C. motor the further result is assured that, even at very low rates of revolution and within a wide range of rates of revolution, a high torque is available.

In order to prevent the maximum or minimum counter contents from being already reached before one of the two pulse transmitters can effect a backward or forward adjustment of the counter when great speed changes per time unit in the first shaft occur, the maximum counter contents selected must be as large as possible i.e., a counter with a plurality of stages must be used. Since this, however, requires an evaluation circuit with a suitable plurality of structural elements and both features result in a substantial structural volume, it is particularly advantageous to provide instead a counter with a small number of stages and means for avoiding an overcounting in both counting directions.

A conventional electronic forward-backward counter can be used for the purpose, in which case, for the sake of a simple structure of the evaluation circuit, a binary counter is suitable. In a preferred embodiment, in order to prevent overcounting in one counting direction, the pulse transmitter actuated by the vehicle shaft is connected to the counter input assigned to this pulse transmitter through a conjunction element whose other input is connected, through a connection, to the outputs of the counter. The connection stage gives a signal at a specific counter contents. The pulse transmitter actuated by the shaft of the D.C. motor is connected to the counter input assigned to it through a conjunction element whose other input is connected to the output of a flip-flop circuit, which in turn is connected at its output of the present input of the counter. This effectively prevents the overcounting in the other counting direction. The flip-flop circuit is adjustable, at specific contents of the counter, by means of a connection stage to which the counter output signals are fed and which can be reset by a signal of the pulse transmitter actuated by the vehicle shaft.

The potential difference in the zero-balanced diagonal of the bridge is utilized to regulate the rate of revolution of the D.C. motor. Since the ohmic resistance of the bridge would have to be very low and the bridge would have to be capable of bearing high loads when the signal is directly fed to the motor, optionally an operation amplifier is provided in the zero-balanced diagonal of the bridge. The D.C. motor is connected between the output of the amplifier and a voltage divider connected to the operation voltage. For the same reasons, the D.C. motor is most suitably connected through an impedance transformer to the voltage divider.

The invention will be explained in greater detail with the aid of the drawing which contains an exemplified embodiment of the invention.

The apparatus shown in the sole FIGURE of drawings serves to transmit the rotary motion of a motor vehicle shaft 1 whose rotational speed is a function of the traveling speed of the vehicle, to the driving shaft 2 of an eddy current speedometer 3 which contains a mileage measuring mechanism 4. The apparatus thus replaces the flexible shaft usually employed for connecting the two shafts 1 and 2.

To produce a series of pulses proportional to the number of revolutions of shaft 1, a conventional pulse transmitter 5 is provided which can operate inductively, capacitively, galvanically or photoelectrically. The output of pulse transmitter 5 is connected to one input of an AND gate 6 whose output is connected to the forward counting input V of a five-stage binary counter 7. The backward counting input R of the counter is connected to the output of a further AND gate 8, one of the inputs of which is connected to a second pulse transmitter 9 which produces a series of pulses proportional to the number of revolutions of a shaft 10. Shaft 10, which constitutes the armature shaft spindle of a D.C. motor 11, is connected in a positive or form-locking manner to drive the shaft 2 of the eddy current speedometer 3.

The outputs of the individual stages of the counter are connected to a current-oriented evaluation circuit 12 consisting of five ohmic resistors 13,14,15,16 and 17. The resistors of the evaluation circuit 12 can be provided individually or in combination with current inputs according to the prevailing counter contents, by connection to the positive operating potential $U_B$ through the counter. The evaluation circuit 12 is a branch of a bridge 18 having a feed-back operational amplifier 19 inserted in the zero-balanced diagonal D–D' of the bridge. One power-input terminal E of the D.C. motor 11 is connected to the output of the operation amplifier 19. The other power-input terminal F of the D.C. motor 11 is connected, through an impedance transformer 20, to a voltage divider 21 connected to the operating voltage $U_B$.

The outputs of the individual stages of the counter are furthermore connected to a NAND gate 22 and to a NOR gate 23. The output of the NAND gate 22 is connected to the other input of the AND gate 6, and the output of the NOR gate 23 is connected to the setting inputs of a flip-flop circuit 24. The regular output J of the flip-flop circuit is connected to the second input of the AND gate 8 and, through an inverter 25, to the preset input P of the counter. The clear input C of the flip-flop circuit 24 is fed, through a differentiating element 31, from the output of the AND gate 6.

In the equilibrium state of the apparatus, the counter is in a position corresponding to the binary value "16," which means that resistor 17 of the evaluation circuit 12 has its end positioned at the side of the counter connected to the positive operation voltage potential, and the other resistors of evaluation circuit 12 carry no current. In this state, the bridge is balanced, i.e., the resistances of resistors 17 and 26, and of resistors 27 and 28 are in each case of the same magnitude. Furthermore, the resistance of the feedback resistors 29 equals that of resistor 17. Since, in addition the voltage drop at resistor 28 equals that prevailing at the lower resistance of the voltage divider 21, the voltage difference at the terminals of the D.C. motor equals zero or near zero, and the motor is at rest. As soon as the vehicle shaft starts rotating, the first pulse transmitter 5 feeds a pulse to the AND gate 6 which passes this pulse to the counter, the conjunction in the NAND gate 22 having not been accomplished. Thereby resistor 13, whose resistance value is 16 times higher than that of resistor 17, is switched on. The total effectively parallel resistance prevailing then in the bridge branch is slightly lower than that of resistor 17. The bridge is therefore slightly balanced and the D.C. motor slowly starts rotating. When the next pulse arrives at the forward counting input of the binary counter, resistor 13 becomes inoperative, and resistor 14 whose resistance is eight times as high as that of resistor 17 is switched on, so that the total resistance becomes still lower and the D.C. motor rotates faster. Due to the rotation of motor shaft 10, pulse transmitter 9 transmits also a pulse which, since the disjunction in the NOR gate 23 has not been accomplished, enters the backward counting input of the binary counter and sets the latter back by one unit. Consequently resistor 14 becomes again inoperative, resistor 13 is turned on again, and the voltage difference at the terminals of the D.C. motor is again reduced. When then a new pulse arrives at the forward counting input, the terminal voltage at the D.C. motor increases again until a new pulse from the second pulse transmitter 9 cancels this effect. This process repeats itself until both, the vehicle shaft and the speedometer shaft rotate at the same rate of revolutions.

A situation is envisioned, when at a very rapid angular acceleration of shaft 1, the binary counter could count quickly to the binary value "31," at which value all resistors would be switched on and a very low total resistance would prevail, since the resistance of resistor 15 amounts to four times, and the resistance of resistor 16 to twice the resistance of resistor 17. On receipt of a further pulse, the binary counter would enter a position corresponding to the binary final value "32," at which all resistors are switched off, without any pulse having been transmitted by pulse transmitter 9 up to this time. The result would be that the D.C. motor would accelerate in the opposite direction, the indicator would indicate no speed, and the mileage measuring mechanism would be turned back.

This is avoided by the provision of a suitable safety mechanism in the form of the NAND gate 22. For, as soon as the counter reaches the binary value "31," the conjunction in the NAND gate 22 is accomplished, and the latter transmits an "O" signal to the AND gate 6 and blocks the latter. Consequently, no further pulses can reach the forward counting input of the counter, and the D.C. motor 11 can start rotating in the intended direction. The pulses then arriving from the pulse transmitter 9 reset the counter and at the same time the blocking of the AND gate 6 is cancelled because the conjunction no longer prevails in the NAND gate 22.

Furthermore, when a brake is strongly applied to the rotating vehicle shaft, it could happen that, after the vehicle shaft comes to a standstill, pulses still would be fed to the counter by the pulse transmitter 9 only. Then the counter would count up to the binary value "0" 0 and then back beginning from the binary value 3. This would have the result that the D.C. motor is decelerated in a desired manner until the binary value 0 is reached, and when this value is exceeded, the motor would be re-accelerated in opposite direction.

This is prevented by the presence of the NOR gate 23 and the flip-flop circuit 24. For, as soon as the binary value 0 has been reached, the disjunction in the NOR gate 23 has been accomplished, whereby the flip-flop circuit 24 is set. By the 0 signal occuring then at the output of the flip-flop circuit 24, the AND gate 8 is blocked, so that the counter does not count backward any further, and, through the inverter 25, the counter is reset at terminal P to its basic position which corresponds to the neutral or equilibrium binary value "16." This blocking is cancelled as soon as the pulse transmitter 5 transmits pulses again, since with the first pulse transmitted by pulse transmitter 5 the flip-flop circuit 24 is reset at terminal C to its initial position through line 30, and through the differential element 31. The differential element 31 is provided, for instance, for the purposes of preventing cancellation of the flip-flop circuit 24 while it is set through NOR gate 23 in the case of long pulses transmitted by pulse transmitter 5.

Since a large portion of the electric circuitry can be constructed in the form of an intergrated circuit, the result achieved is obviously an apparatus whose structural volume depends essentially on the D.C. motor employed. When a small or very small motor is used, the total dimensions of the apparatus can therefore be kept very small.

What is claimed is:

1. An apparatus for causing a meter to measure the rate of rotation of a first shaft, comprising:
  A. said meter,
  B. a first pulse transmitter for providing a first train of pulses at a pulse rate proportional to the rate of rotation of the first shaft,
  C. an electronic multi-stage forward-backward counter having a backward-counting input, a forward-counting input, and an output from each of the stages,
  D. means for applying the first train of pulses to one of the inputs of the counter,
  E. a d.c. electric motor including a second shaft driven by the motor and connected to drive said meter, and further including a power input with two power input terminals for driving the motor,
  F. a second pulse transmitter for providing a second train of pulses at a pulse rate proportional to the rate of rotation of the second shaft,
  G. means for applying the second train of pulses to the other of the inputs of the counter,
  H. a bridge circuit having a plurality of legs forming a diagonal adapted to be balanced to zero, one of the legs of the bridge comprising a plurality of weighted impedances respectively connected to the separate stages of the multi-stage counter and arranged to have current applied through the weighted impedances to one side of said diagonal under switching control of the respective stages of the counter,
  I. diagonal-output means for applying a voltage proportional to whatever voltage exists across said diagonal to one of the two power input terminals of the motor, and
  J. a voltage divider connected to the other of the two input terminals of the motor.

2. An apparatus as claimed in claim 1, wherein said counter is a binary counter.

3. An apparatus as claimed in claim 1, wherein said counter is a counter with a small number of stages, further comprising:
  means for the prevention of overcounting in one of the two counting direction.

4. An apparatus as claimed in claim 3, further comprising:
  means for preventing overcounting in the other of the two counting directions.

5. An apparatus as claimed in claim 3, wherein the means for the prevention of overcounting comprises means for gating off the first train of pulses from the first pulse transmitter.

6. An apparatus as claimed in claim 3, wherein the means for the prevention of overcounting in one direction comprises:
  A. a gating element for receiving one of the pulses from the pulse transmitter which provides the one train and for counting the one train through the gating element to its counter input, and
  B. means connected to the outputs of the counter for providing a gating signal at the occurrence of specific counter contents and for applying the gating signal to control the gating element.

7. An apparatus as claimed in claim 3, wherein the means for prevention of overcounting in one direction comprises:
  A. a flip-flop means having a setting input, a clear input, and means for providing a regular and an inverted output signal,
  B. a gating element for receiving one of the trains of pulses from the pulse transmitter which provides the one train and for connecting the one train through the gating element to its counter input, C. means connected to the outputs of the counter for providing a setting signal at specific counter contents and for applying the setting signal to the setting input of the flip-flop means,
D. means responsive to the regular output signal of the flip-flop when it is set for operating the gating element to prevent the one train from reaching its counter input,
E. means responsive to the inverted output signal from the flip-flop when it is set for resetting the counter to a neutral value, and
F. means responsive to additional pulses from the other of the two pulse transmitters for resetting the flip-flop.

8. An apparatus according to claim 1,
A. wherein the diagonal-output means comprises an operational amplifier having input terminals connected across the diagonal and having an output connected to one terminal of the power input of the motor.

9. An apparatus as claimed in claim 8 further comprising:
an impedance transformer for connecting the voltage divider to said other terminal of the power input of the motor.

10. An apparatus for causing a meter to measure the rate of rotation of a vehicle shaft, comprising:
A. said meter,
B. a first pulse transmitter (5) for providing a first train of pulses at a pulse rate proportional to the rate of rotation of the vehicle shaft (1),
C. a binary electronic multi-stage forward-backward counter (7) having a backward-counting input (R), a forward counting input (V) and an output from each of the stages (to 13-17),
D. means for applying the first train of pulses to the forward-counting input (V) of the counter,
E. a d.c electric motor (11) including a motor shaft (10) driven by the motor and connected to drive said meter (3), and further including a power input with two power input terminals (E, F) for driving the motor,
F. a second pulse transmitter (9) for providing a second train of pulses at a pulse rate proportional to the rate of rotation of the motor shaft (10).
G. means for applying the second train of pulses to the backward-counting input (R) of the counter,
H. a bridge circuit having a plurality of legs forming a diagonal (D-D') adapted to be balanced to zero, one of the legs of the bridge comprising a plurality of weighted resistances (13-17) respectively connected to the separate stages of the multi-stage counter and arranged to have current applied through the weighted resistances to one side (D) of the diagonal under switching control of the respective stages of the counter,
I. an operational amplifier having input terminals connected across the diagonal (D-D') and having an output connected to one terminal (E) of the power input of the motor,
J. a voltage divider (21),
K. an impedance transformer (20) for connecting the voltage divider to the other terminal (F) of the power input of the motor,
L. a first gating element (6) for receiving the first train of pulses from the first pulse transmitter for connecting the first train to the means for applying the first train to the forward-counting input of the counter,
M. means (22) connected to the outputs of the counter for providing a first gating signal at the occurrence of a maximum forward count in the counter and for applying the first gating signal to control the first gating means,
N. a flip-flop means (24) having a setting input, a clear input, and means for providing a regular and an inverted output signal,
O. a second gating element (8) for receiving the second pulse train from the second pulse transmitter for connecting the second train to the means for applying the second train to the backward counting input of the counter,
P. means (23) connected to the outputs of the counter for providing a setting signal at the occurrences of a maximum backward count in the counter and for applying the setting signal to the setting input of the flip-flop means,
Q. means responsive to the regular output signal (J) of the flip-flop, when the flip-flop is set, for providing a second gating signal for operating the second gating element (8) to prevent the second train from reaching the backward-counting input of the counter,
R. means responsive to the inverted output signal (25) from the flip-flop, when the flip-flop is set, for resetting (P) the counter to a neutral value ("16"), and
S. differentiating means (31) responsive to additional pulses from the first pulse transmitter for resetting (C) the flip-flop.

* * * * *